(12) United States Patent
Usui (10) Patent No.: US 6,269,128 B1
(45) Date of Patent: Jul. 31, 2001

(54) CLOCK RECOVERY CONTROL IN DIFFERENTIAL DETECTION

(75) Inventor: Hisayoshi Usui, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/162,888

(22) Filed: Sep. 30, 1998

(30) Foreign Application Priority Data

Sep. 30, 1997 (JP) .................................................. 9-265607

(51) Int. Cl.[7] .............................. H04L 27/18; H04L 27/22
(52) U.S. Cl. ...................... 375/326; 375/327; 375/376; 327/159; 327/160; 329/341
(58) Field of Search .................................. 375/326, 327, 375/328, 371, 373, 374, 375, 376, 330, 331; 327/155, 156, 157, 159, 160; 329/307, 341, 343

(56) References Cited

U.S. PATENT DOCUMENTS

| | | | |
|---|---|---|---|
| 5,574,399 | * 11/1996 | Oura et al. | 329/306 |
| 5,594,758 | 1/1997 | Petranovich | 375/344 |
| 5,668,838 | * 9/1997 | Nakamura et al. | 375/340 |
| 5,691,967 | * 11/1997 | Ando | 369/50 |
| 5,867,542 | * 2/1999 | Iwamatsu et al. | 375/354 |

FOREIGN PATENT DOCUMENTS

| | | |
|---|---|---|
| 2 255 480 | 11/1992 | (GB) . |
| 2-222344 | 9/1990 | (JP) . |
| 4-330839 | 11/1992 | (JP) . |
| 7-154432 | 6/1995 | (JP) . |
| 7-162470 | 6/1995 | (JP) . |
| 8-163187 | 6/1996 | (JP) . |
| 9-18534 | 1/1997 | (JP) . |

* cited by examiner

Primary Examiner—Young T. Tse
(74) Attorney, Agent, or Firm—Sughrue, Mion, Zinn, Macpeak & Seas, PLLC

(57) ABSTRACT

A digital demodulator for demodulating a digital-Modulated signal into received data using differential detection includes a clock recovery circuit where a phase of the clock is adjustable in steps of a clock corrective width. A variance calculator is further included for calculating a variance of phase differences in the digital-modulated signal. The clock corrective width of the clock recovery circuit is controlled based on the variance and the received signal strength such that the clock corrective width is decreased when it is determined from the variance and the received signal strength that interference occurs.

24 Claims, 5 Drawing Sheets

CLOCK RECOVERY CONTROL IN DIFFERENTIAL DETECTION

BACKGROUND OF THE INVENTION

1. Field of the Invention

The present invention generally relates to a digital demodulator suitable for wireless digital communication equipment and, in particular to a clock recovery control technique for the digital demodulator employing differential detection.

2. Description of the Related Art

As well known, π/4-shift quadrature phase-shift keying (QPSK) is, simply described, a form of QPSK modulation in which the QPSK signal constellation is shifted by 45 degrees each symbol interval. Therefore, the phase transitions from one symbol to the next are restricted to ±π/4 and ±3π/4. Although the π/4-shift QPSK modulation can be implemented with coherent or differential detection, it is frequently implemented with differential detection because it is more simple, which is called differential π/4-shift QPSK, denoted simply as π/4-shift DQPSK. The π/4-shift DQPSK modulation scheme has been widely used for mobile communication equipment.

In such a conventional differential detector, however, when interference occurs, there are cases where a clock recovery circuit follows the interference wave, resulting in erroneous data decision.

SUMMARY OF THE INVENTION

An object of the present invention is to provide a digital demodulator and a clock recovery control method that can provide reliable and stable clock regeneration even when interference occurs.

Another object of the present invention is to provide a digital demodulator that can perform precise differential detection.

The inventor has found that the erroneous data decision due to interference can be eliminated by changing a clock corrective width, or a clock tracking band width, of the clock recovery circuit depending on whether interference occurs.

According to an aspect of the present invention, a digital demodulator for demodulating a digital-modulated signal into received data using differential detection includes a level detector for detecting a received signal strength and a clock regenerator for regenerating a clock from the digital-modulated signal, wherein a phase of the clock is adjustable in steps of a clock corrective width. The digital demodulator further includes a variance calculator for calculating a variance of phase differences in the digital-modulated signal and a controller for controlling the clock corrective width of the clock regenerator based on the variance and the received signal strength.

Since the clock corrective width is controlled based on the variance and the received signal strength, reliable and stable clock recovery can be achieved even in the presence of interference.

The controller may determine whether interference occurs based on the variance and the received signal strength and control the clock corrective width depending on whether interference occurs. When it is determined that interference occurs, it is preferably that the clock corrective width is decreased.

The controller may determine whether the received signal strength is greater than a predetermined level and further whether the variance is greater than a predetermined value and then control the clock corrective width depending on a result of determination. When the result of determination is that the received signal strength is greater than the predetermined level and the variance is greater than the predetermined value, it is preferably that the clock corrective width is decreased.

According to another aspect of the present invention, the digital demodulator further includes a data detector for detecting that constant-value data is consecutively received for more than a predetermined time period. The controller controls the clock regenerator such that the phase of the clock is fixed when it has been detected that the constant-value data is consecutively received for more than the predetermined time period.

When the constant-value data is consecutively received for more than the predetermined time period, it can be determined that non-modulated interference occurs. In order to prevent the clock from being disturbed by the non-modulated interference, the phase of the clock is preferably fixed. In this manner, the clock phase correction control according to the present invention provides reliable and stable clock recovery even in the presence of modulated or non-modulated interference.

DETAILED DESCRIPTION OF THE PREFERRED EMBODIMENT

Taking a π/4-shift DQPSK demodulator as a preferred example of a differential detector, the details will be described hereinafter.

Figure 1:
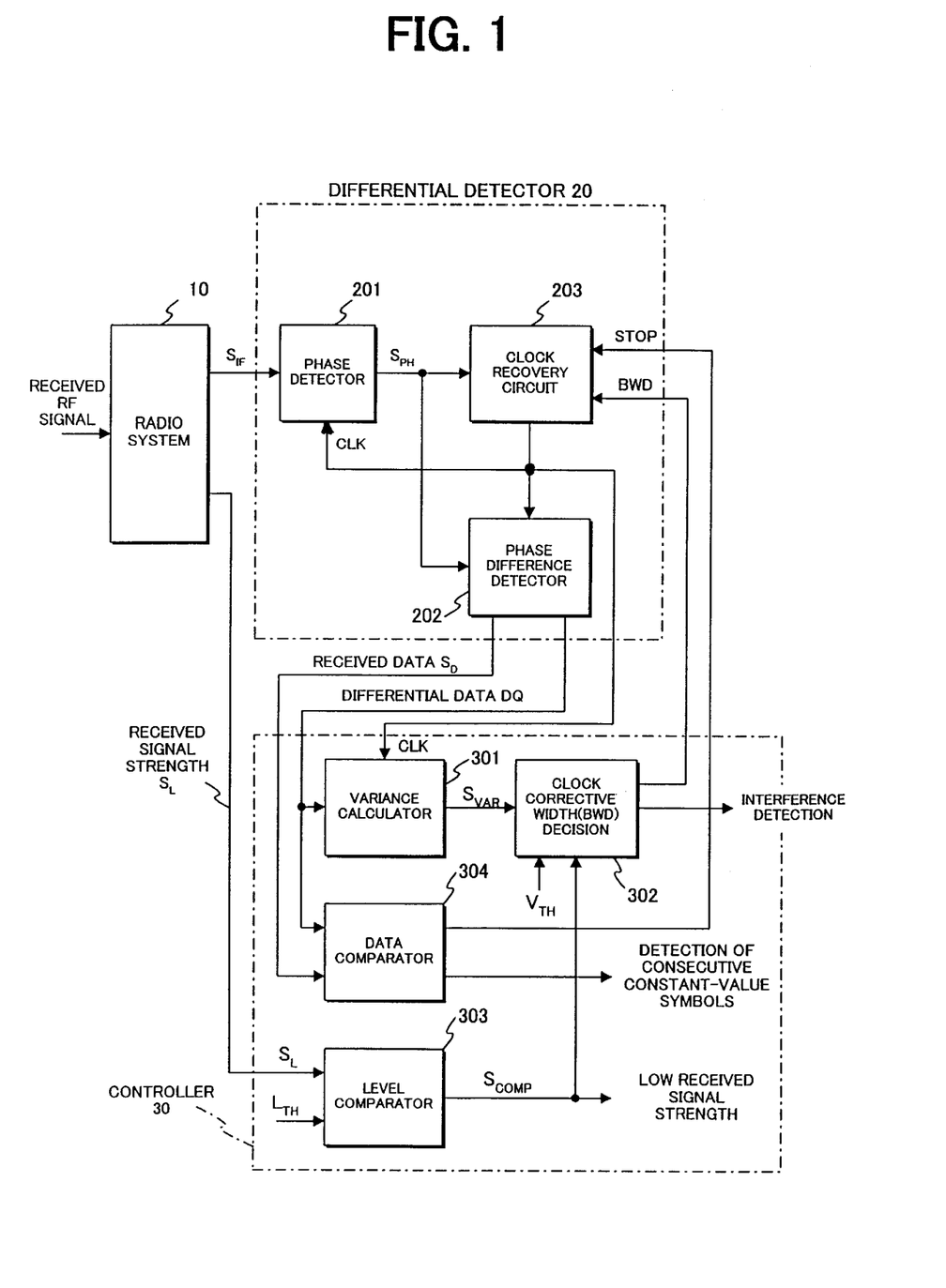
FIG. 1 is a block diagram showing the functional configuration of a digital demodulator according to an embodiment of the present invention.

Referring to FIG. 1, a radio system 10 receives a received radio-frequency (RF) signal and converts it to intermediate frequency (IF) signal $S_{IF}$ which is modulated in π/4-shift DQPSK modulation scheme. Further the radio system 10 detects the strength (electric field level) $S_L$ of a received RF signal. A digital demodulator according to the present invention is comprised of a differential detector 20 and a controller 30 which receive the IF signal $S_{IF}$ and the received signal strength $S_L$ from the radio system 10, respectively.

The differential detector 20 includes a phase detector 201, a phase difference detector 202 and a clock recovery circuit 203. The phase detector 201 receives the IF signal $S_{IF}$ and generates a phase signal $S_{PH}$ according to a symbol clock signal CLK generated by the clock recovery circuit 203. The phase difference detector 202 receives the phase signal $S_{PH}$ from the phase detector 201 and detects data $S_D$ and differential data DQ according to the symbol clock signal CLK.

The clock recovery circuit 203 generates the symbol clock signal CLK from the phase signal $S_{PH}$ and the clock recovery operation is controlled by a stop signal STOP and a clock corrective width (or bandwidth designation) signal BWD that are received from the controller 30. The clock corrective width BWD is a control signal that designates the magnitude of a clock corrective width (unit) in the clock recovery circuit 203, as will be described later. The clock recovery circuit 203 outputs the symbol clock signal CLK to the phase detector 201 and the phase difference detector 202 as well as the controller 30.

The controller 30 is implemented with a digital computing circuit or a program-controlled processor. The controller 30 is comprised of a variance calculator 301, a clock corrective width decision section 302 and a level comparator 303. The variance calculator 301 calculates the variance $S_{VAR}$ of a predetermined number (N) of differential data $DQ_1$–$DQ_N$ and output it to the clock corrective width decision section 302. The level comparator 303 compares the received signal strength $S_L$ to a predetermined level threshold $L_{TH}$ and output the comparision result $S_{COMP}$ to the clock corrective width decision section 302.

The clock corrective width decision section 302 determines whether interference occurs by comparing the variance $S_{VAR}$ to a predetermined variance threshold $V_{TH}$ taking the comparision result $S_{COMP}$ into account. The clock corrective width decision section 302 reduces the magnitude of the bandwidth designation signal BWD when it is determined that interference occurs and increases it when it is determined that no interference occurs. If it can not be determined, the bandwidth designation signal BWD is fixed. The details will be described later.

The data comparator 304 is used to detect a receiving state where constant-value data is consecutively received during more than a predetermined number of symbols. When such a receiving state is detected, the data comparator 304 outputs the stop signal STOP to the clock recovery circuit 203 of the differential detector 20. In the case where an interference wave that is not modulated is received, the differential detector 20 detects data $S_D$ of consecutive 0s or 1s. Making use of such a response of the differential detector 20, the data comparator 304 determines whether the non-modulated interference wave is influencing the desired signal. When it is determined that the non-modulated interference wave is influencing the desired signal, the stop signal STOP is output to the clock recovery circuit 203. Upon receipt of the stop signal STOP, the clock recovery circuit 203 stops the clock phase correction operation to prevent the symbol clock signal CLK from being disturbed.

In the case where the controller 30 is implemented with a digital computing circuit, the above circuits 301–304 are connected to form the controller 30 as shown in FIG. 1. In the case of a program-controlled processor, a control program implementing the above functions is stored in a read-only memory (not shown) and the program-controlled processor runs the control program to perform the clock recovery control which will be described referring to FIGS. 4 and 5.

PHASE DETECTOR

The phase detector 201 detects the phase of a received IF signal $S_{PH}$ according to the symbol clock signal CLK to produce the phase signal $S_{IF}$. More specifically, the phase detector 201 may be a self-running counter that runs according to a reference clock and outputs the count value as the phase signal $S_{PH}$ at the timing of the symbol clock signal CLK.

For example, the phase detector 201 is a 5-bit self-running counter which runs according to the reference clock of 14.4 MHz and the IF signal $S_{IF}$ is 450 KHZ which is multiplied by 32 to obtain the frequency of 14.4 MHz. Therefore, on the rising edge of the IF signal $S_{IF}$, the 5-bit counter reads the corresponding one of the possible values 0–31 and outputs the corresponding value as the phase signal $S_{PH}$ at the timing of the symbol clock signal CLK. In other words, the whole phase range from 0 to 360 degrees ($2\pi$) of the IF signal $S_{IF}$ is divided into 32 equal parts and therefore the instantaneous phase of the IF signal $S_{IF}$ is represented by the corresponding count value of the 5-bit self-running counter.

As described before, the phase transitions from one symbol to the next in the $\pi/4$-shift DQPSK modulation are restricted to $\pm\pi/4$ and $\pm3\pi/4$. Therefore, if the phase signal $S_{PH}$ is a count value of $C_{PH}$ ($C_{PH}$=0, 1, 2, 3, – or 31) at a symbol timing, then a count value at the next symbol timing is expected to be $C_{PH}\pm4$ or $C_{PH}\pm12$. For example, if the count value $C_{PH}$ is 0 at a symbol timing, an ideal count value at the next symbol timing is one of 4 (at $+\pi/4$), 28 (at $-\pi/4$), 12 (at $+3\pi/4$), 20 (at $-3\pi/4$).

PHASE DIFFERENCE DETECTOR

The phase difference detector 202 receives the phase signal $S_{PH}$ from the phase detector 201 and detects data $S_D$ and differential data DQ according to the symbol clock signal CLK. The differential data DQ is a phase difference between the data $S_{D(i)}$ at a symbol timing and the next data $S_{D(i+1)}$ at the next symbol timing. In other words, the differential data DQ is obtained by detecting a difference between the count value at symbol timing and the count value at the next symbol timing.

In the case where the count value is 0 at a symbol timing and the next timing count value is 3, the next timing count value "3" is smaller than the ideal count value "4" by one and therefore the differential data DQ is "–1". Further, in the case where the next timing count value is 30, the next timing count value "30" is larger than the ideal count value "28" by 2 and therefore the differential data DQ is "+2".

CLOCK RECOVERY CIRCUIT

Figure 2:
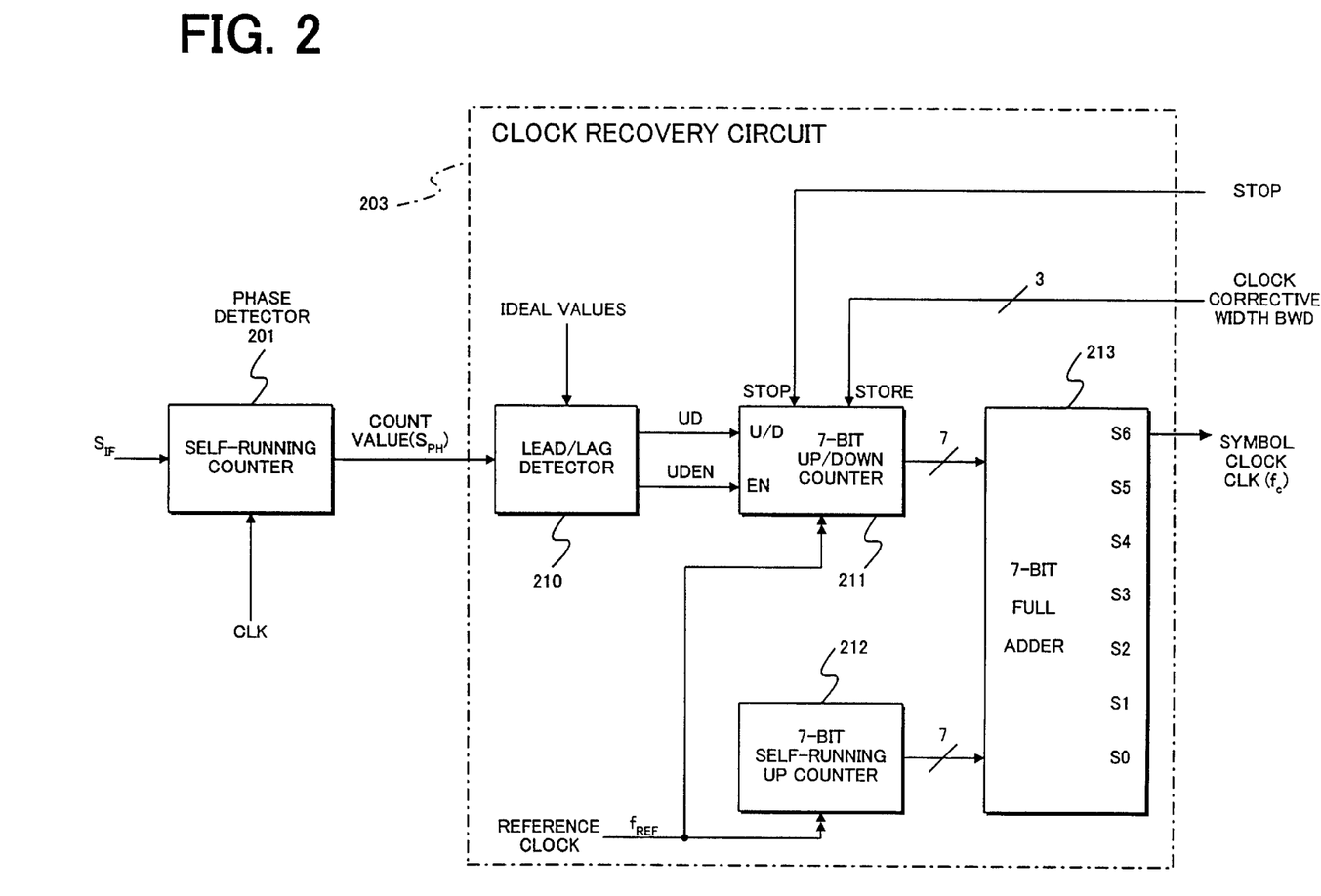
FIG. 2 is a block diagram showing the functional configuration of a clock recovery circuit of the embodiment as shown in FIG. 1.

Referring to FIG. 2, the clock recovery circuit 203 is comprised of a lead/lag detector 210, an up/down counter 211, a self-running counter 212 and a full adder 213. A reference clock is supplied to the up/down counter 211 and the self-running counter 212 and the respective counters are added by the full adder 213 to form a symbol clock CLK. For example, in the case of the reference clock having a reference frequency $f_{REF}$=2.68 MHz, the reference frequency of 2.688 MHz is divided by 128 to generate a symbol clock frequency of 21 KHz which is a symbol repetition frequency provided in Japanese Digital Cellular standard.

The lead/lag detector 210 determines whether the phase signal $S_{PH}$ leads or lags behind the corresponding ideal phase. When leading, the lead/lag detector 210 sets an up/down signal UD to "1" and an up/down enable signal UDEN to "1" and, when lagging, the up/down signal UD to "0" and the up/down enable signal UDEN to "1". When neither leading nor lagging, the up/down enable signal UDEN is set to "0".

In the above example, when the present timing count value is smaller than the ideal count value, it is determined that the present symbol timing lags behind the ideal phase and therefore the up/down signal UD=0 and the up/down enable signal UDEN=1 are output to the up/down counter 211. In the case where the present timing count value is larger than the ideal count value, it is determined that the present symbol timing leads the ideal phase and therefore the up/down signal UD=1 and the up/down enable signal UDEN=1 are output to the up/down counter 211.

The up/down counter 211 increments or decrements a counter with each reference clock depending on the up/down signal UD and the up/down enable signal UDEN. The magnitude of an increment or a decrement is designated by the clock corrective width signal BWD received from the clock corrective width decision section 302 of the controller 30. In this embodiment, after the phase signal is coincident with the ideal phase, the designated increment/decrement is set to a value prescribed according to the present digital cellular standard. In Japanese Digital Cellular standard, the designated increment/decrement is normally set to 4.

Further, the up/down counter 211 stops up/down operation when the stop signal STOP is received from the data comparator 340 of the controller 30. The clock phase correction stop control by the stop signal STOP takes priority over the clock phase correction control by the clock corrective width signal BWD.

As shown in the following table, when the up/down signal UD changes to 1 in the case of UDEN=1, the up/down counter 211 increments a counter by a value designated by the clock corrective width signal BWD. On the other hand, when the up/down signal UD changes to 0 in the case of UDEN=1, the up/down counter 211 decrements a counter by the value designated by the clock corrective width signal BWD.

TABLE

|  | UD = 1 | UD = 0 |
|---|---|---|
| UDEN = 1 | Increment by BWD | Decrement by BWD |
| UDEN = 0 | Unchanged | Unchanged |

The self-running up counter 212 repeatedly increments a counter with each reference clock until the counter reaches 127. The respective output counters of the up/down counter 211 and the self-running up counter 212 are added by the full adder 213 to produce the symbol clock CLK.

In the case of the reference clock frequency $f_{REF}$2.68 MHz, the symbol clock frequency $f_c$=21 KHz is produced by dividing the reference clock frequency $f_{REF}$=2.688 MHz by 128. Therefore, the clock recovery circuit 203 can adjust the phase of the symbol clock CLK in steps of an integral multiple of $2\pi/128$. The clock corrective width signal BWD designates the magnitude of the multiple.

In the Japanese Digital Cellular standard, the magnitude of the multiple is fixed to 4. However, according to the present invention, the magnitude of the multiple can be changed depending on the clock corrective width signal BWD, received from the controller 30. The larger the clock corrective width BWD the lower the accuracy of clock phase correction. Contrarily, as the clock corrective width BWD is narrower, the clock phase is more accurately corrected. Next, the details of the clock phase correction control will be described.

CLOCK PHASE CORRECTION CONTROL

In the differential detector such as the $\pi/4$-shift DQPSK demodulator, a variance $S_{VAR}$ of phase difference and a received signal strength $S_L$ are used to determine whether interference occurs. And the magnitude of the clock corrective width BWD can be changed depending on the interference determination.

Figure 4:
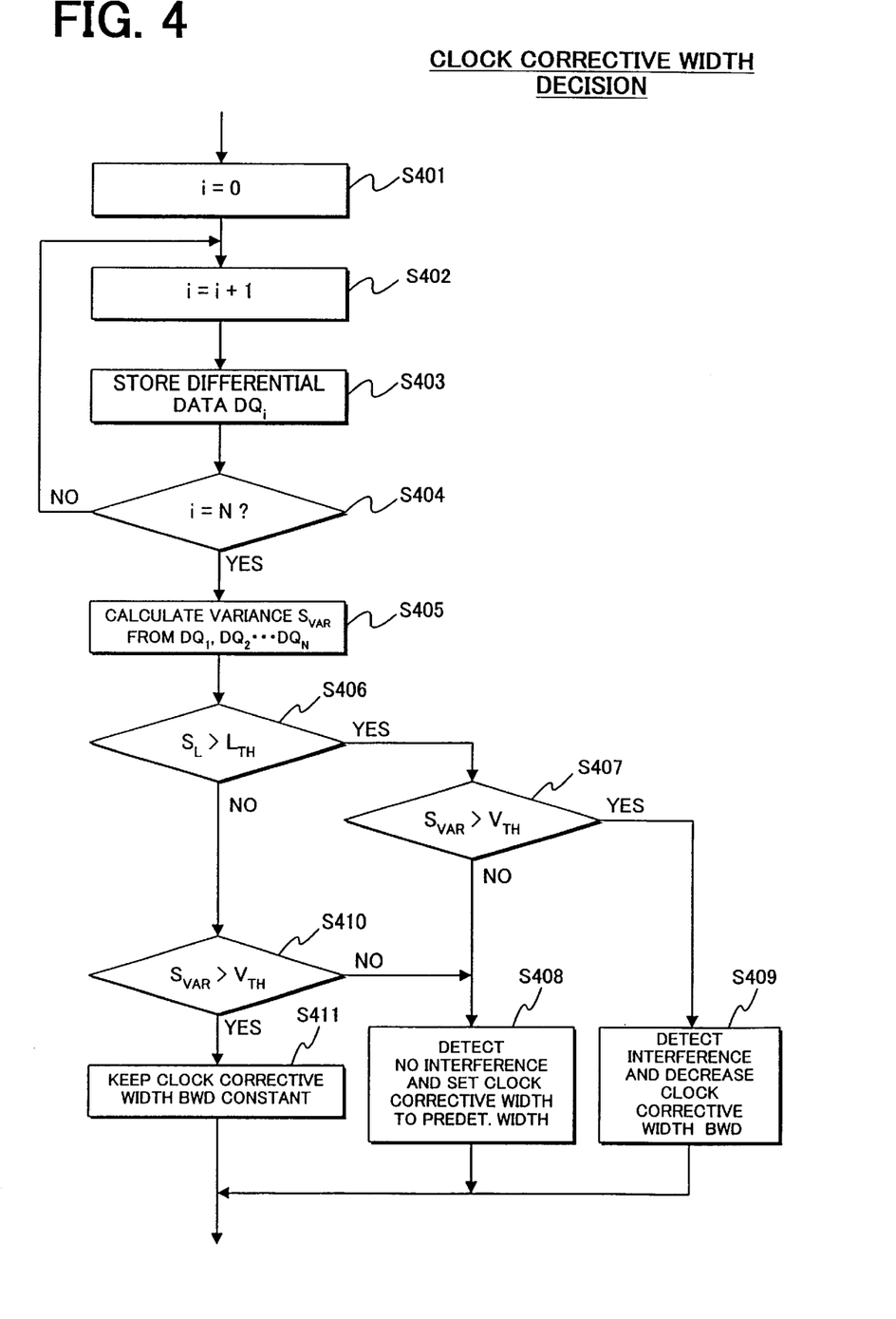
FIG. 4 is a flow chart showing the control operation for clock corrective width determination performed by a processor.

Referring to FIG. 4, after the variance calculator 301 initializes a variable i to 0 (step S401), the variable i is incremented (step S402), and then differential data $DQ_i$ is stored at the timing of the symbol clock CLK (step S403). The steps S402 and S403 are repeatedly performed until the variable i reaches a predetermined value N. In this manner, N differential data $DQ_i$–$DQ_N$ for N consecutive symbol points are stored. It has been found that differential data DQ is almost 0 in the case of good receiving conditions but the magnitude of the differential data DQ becomes larger as signal-to-noise ratio deteriorates.

$$\overline{DQ} = \sum_{i=1}^{N} DQ_i / N\Lambda \quad (1)$$

$$S_{VAR} = \sum_{i=1}^{N} (DQ_i - \overline{DQ})^2 \Lambda \quad (2)$$

When receiving the variance $S_{VAR}$ from the variance calculator 301, the clock corrective width decision section 302 determines the clock corrective width BWD taking the present signal strength $S_L$ into account.

Figure 3A:
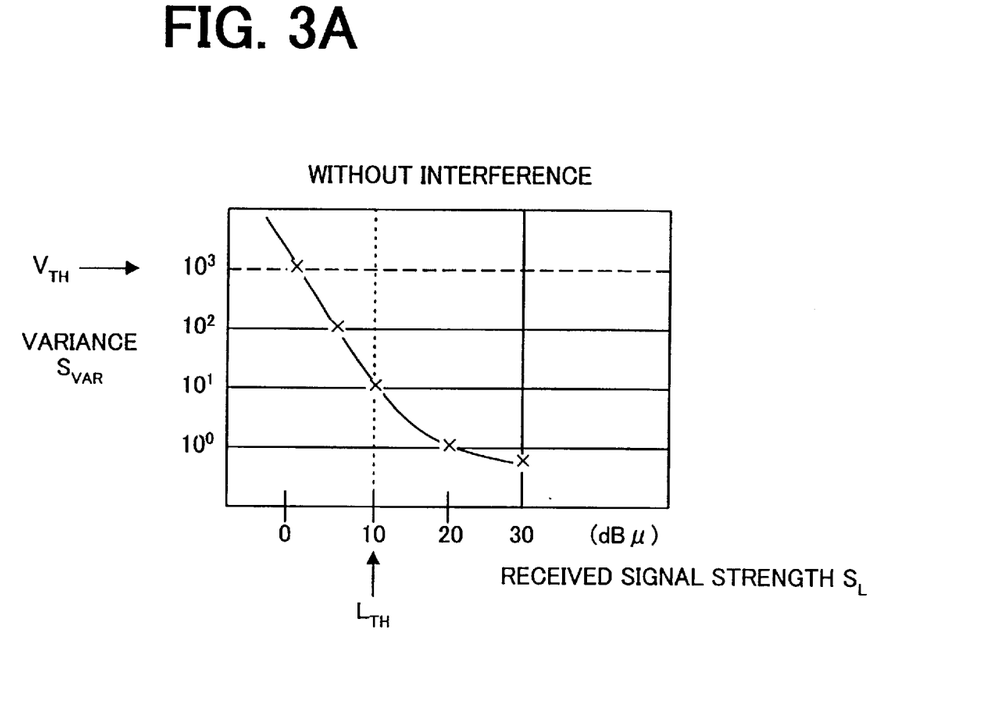
FIG. 3A is a diagram showing a change of variance of received differential data with a received signal strength when no interference occurs.

More specifically, it is determined whether the present signal strength $S_L$ is greater than the received strength threshold $L_{TH}$ (step S406). If $S_L$>$L_{TH}$ (YES in step S406), it is further determined whether the calculated variance $S_{VAR}$ is greater than the level $V_{TH}$ (step S407). If $S_{VAR}$ is not greater than $V_{TH}$ (NO in stop S407), as described in FIG. 3A, it is determined that no interference occurs and the clock corrective width decision section 302 sets the clock corrective width BWD to a predetermined normal width (step S408). In Japanese Digital Cellular standard, the predetermined normal width is 4, that is, $8\pi/128$ as described before.

Figure 3B:
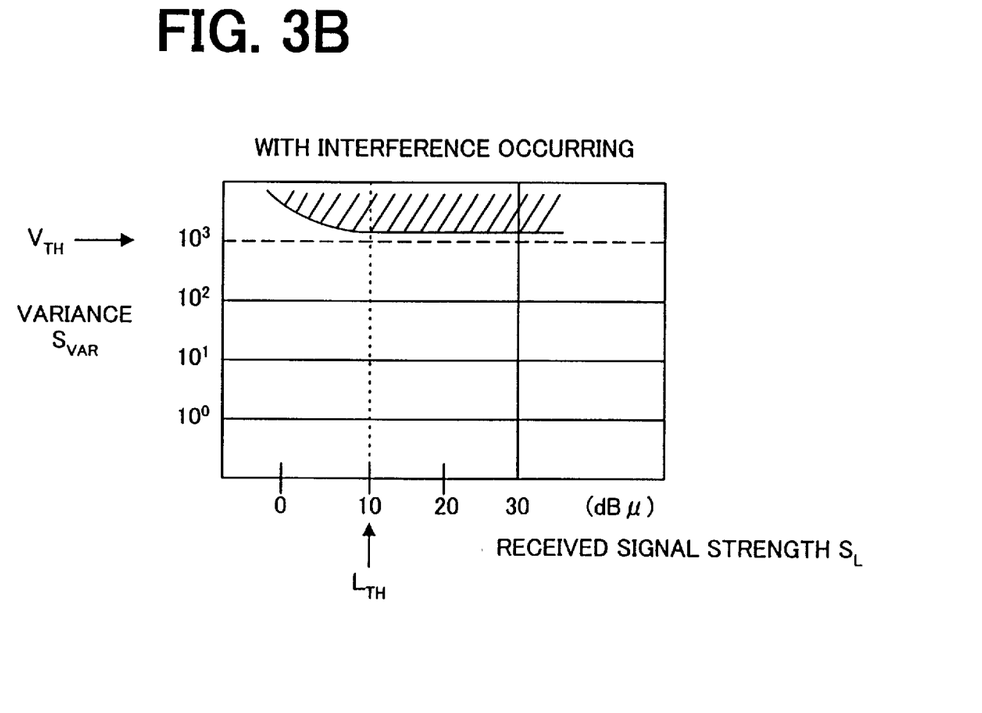
FIG. 3B is a diagram showing a change of variance of received differential data with a received signal strength when interference occurs.

Contrarily, if $S_{VAR}$ is greater than $V_{TH}$ (YES in step S407), as described in FIG. 3B, it is determined that interference occurs and the clock corrective width decision section 302 decreases the clock corrective width BWD to be narrower than the predetermined normal width (step S409). For example, the narrow width BWD is set to the minimum value. In Japanese Digital Cellular standard, the narrower width may be set to 1, that is, $2\pi/128$.

If the present signal strength $S_L$ is not greater than the received strength threshold $L_{TH}$ (NO in step S406), it is further determined whether the calculated variance $S_{VAR}$ is greater than the level $V_{TH}$ (step S410). If $S_{VAR}$ is not greater than $V_{TH}$ (NO in step S410), as described in FIG. 3A, it is determined that no interference occurs and the clock corrective width decision section 302 increases the clock corrective width BWD (step S408).

Contrarily, if $S_{VAR}$ is greater than $V_{TH}$ (YES in step S410), it is impossible to determine whether interference occurs and the clock corrective width decision section 302 keeps the clock corrective width BWD at the present value (step S411).

In this manner, the clock phase correction control is performed based on the variance $S_{VAR}$ and the received signal strength $S_L$. Especially, in the case where the present signal strength $S_L$ is greater than the received strength threshold $L_{TH}$ (YES in step S406) and the variance $S_{VAR}$ is greater than $V_{TH}$ (YES in step S407), the clock corrective width BWD is decreased to be lower than the predetermined normal width (step S409). Since the clock corrective width BWD is smaller, the accuracy of the clock phase correction becomes higher. Therefore, the symbol clock CLK can be regenerated with little influence of interference waves.

DETECTION OF NON-MODULATED INTERFERENCE

Figure 5:
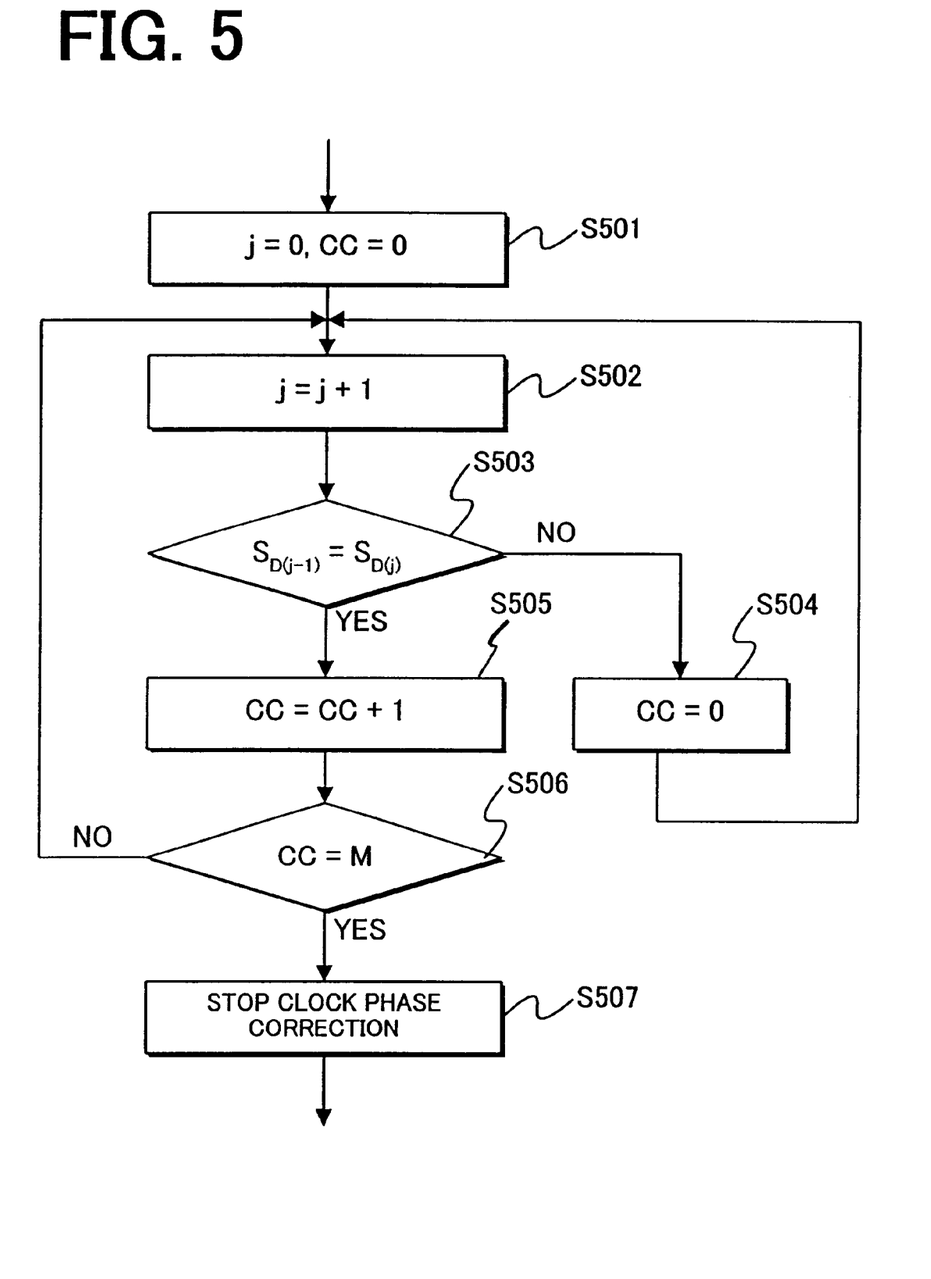
FIG. 5 is a flow chart showing the control operation for detection of consecutive constant-value symbols performed by a data comparator.

Referring to FIG. 5, the data comparator 304 detects a non-modulated interference state where constant-value data is consecutively received during more than a predetermined number of symbols for one frame. More specifically, after the data comparator 304 initializes variables j and CC (step S501), the variable j is incremented by 1 (step S502) and it is determined whether the present data $S_D(j)$ is equal to the one-symbol previous data $S_D(j-1)$ (step S503). If not (NO in step S503), the variable CC is reset to 0 (step S504) and control goes back to the step S502).

If $S_D(j)=S_D(j-1)$ (YES in step S503), then the variable CC is incremented by 1 (step S505) and, if CC is not equal to a predetermined value M (NO in step S506), the steps S502–S505 are repeatedly performed until the variable CC reaches M. The predetermined value M is, for example, the number of symbols in one frame. When the variable CC reaches M (YES in step S506), it means that the consecutive symbol data $S_D(1)$–$S_D(M)$ are all 1s or 0s. Therefore, the data comparator 304 determines whether the non-modulated interference wave is influencing the desired signal and outputs the stop signal STOP to the up/down counter 211 of the clock recovery circuit 203 to stop the clock phase correction (step S507). Upon receipt of the stop signal STOP, the up/down counter 211 stops up/down operation, so that the symbol clock CLK is prevented from being disturbed by the non-modulated interference.

As described above, the clock phase correction control according to the present invention provides reliable and stable clock recovery even in the presence of interference. Further, under non-modulated interference, the symbol clock can be also stably regenerated.

What is claimed is:

1. A digital demodulator for demodulating a digital-modulated signal into received data using differential detection, comprising:
    a level detector for detecting a received signal strength;
    a clock regenerator for regenerating a clock from the digital-modulated signal, wherein a phase of the clock is adjustable in steps of a clock corrective width;
    a variance calculator for calculating a variance of phase differences in the digital-modulated signal; and
    a clock corrective width controller for controlling the clock corrective width of the clock regenerator based on the variance and the received signal strength.

2. The digital demodulator according to claim 1, wherein the controller determines whether interference occurs based on the variance and the received signal strength and controls the clock corrective width depending on whether interference occurs.

3. The digital demodulator according to claim 2, wherein the controller decreases the clock corrective width when it is determined that interference occurs.

4. The digital demodulator according to claim 2, wherein the controller sets the clock corrective width to a predetermined width when it is determined that no interference occurs.

5. The digital demodulator according to claim 2, wherein the controller keeps the clock corrective width as it is when it cannot be determined whether interference occurs.

6. The digital demodulator according to claim 1, wherein the controller determines whether the received signal strength is greater than a predetermined level and further whether the variance is greater than a predetermined value and then controls the clock corrective width depending on a result of determination.

7. The digital demodulator according to claim 6, wherein the controller decreases the clock corrective width when the received signal strength is greater than the predetermined level and the variance is greater than the predetermined value.

8. The digital demodulator according to claim 6, wherein the controller sets the clock corrective width to a predetermined width when the received signal strength is greater than the predetermined level and the variance is not greater than the predetermined value.

9. The digital demodulator according to claim 6, wherein the controller sets the clock corrective width to a predetermined width when the received signal strength is not greater than the predetermined level and the variance is not greater than the predetermined value.

10. The digital demodulator according to claim 6, wherein the controller keeps the clock corrective width as it is when the received signal strength is not greater than the predetermined level and the variance is greater than the determined value.

11. The digital demodulator according to claim 1, further comprising:
    a data detector for detecting that constant-value data is consecutively received for more than a predetermined time period,
    wherein the controller controls the clock regenerator such that the phase of the clock is fixed when it has been detected that the constant-value data is consecutively received for more than the predetermined time period.

12. The digital demodulator according to claim 1, wherein the clock regenerator comprising:
    an up/down counter for incrementing or decrementing a first counter by the clock corrective width with each pulse of a reference input clock depending on whether a phase of the digital-modulated signal leads or lag behind an ideal phase;
    a self-running counter for incrementing a second counter with each pulse of the reference input clock; and
    an adder for adding the first and second counters to convert the reference input clock into the clock.

13. A clock recovery control method for a digital demodulator for demodulating a digital-modulated signal into received data using differential detection, comprising the steps of:
    a) detecting a received signal strength;
    b) regenerating a clock from the digital-modulated signal, wherein a phase of the clock is adjustable in steps of a clock corrective width;
    c) calculating a variance of phase differences in the digital-modulated signal; and
    d) controlling the clock corrective width based on the variance and the received signal strength.

14. The method according to claim 13, wherein the step d) comprises the steps of:
    determining whether interference occurs based on the variance and the received signal strength; and
    controlling the clock corrective width depending on whether interference occurs.

15. The method according to claim 14, wherein the clock corrective width is decreased when it is determined that interference occurs.

16. The method according to claim 14, wherein the clock corrective width is set to a predetermined width when it is determined that no interference occurs.

17. The method according to claim 14, wherein the clock corrective width is kept as it is when it cannot be determined whether interference occurs.

18. The method according to claim 13, wherein the stop d) comprises the steps of:

determining whether the received signal strength is greater than a predetermined level and further whether the variance is greater than a predetermined value; and controlling the clock corrective width depending on a result of determination.

19. The method according to claim 18, wherein the clock corrective width is decreased when the received signal strength is greater than the predetermined level and the variance is greater than the predetermined value.

20. The method according to claim 18, wherein the clock corrective width is set to a predetermined width when the received signal strength is greater than the predetermined level and the variance is not greater than the predetermined value.

21. The method according to claim 18, wherein the clock corrective width is set to a predetermined width when the received signal strength is not greater than the predetermined level and the variance is not greater than the predetermined value.

22. The method according to claim 18, wherein the clock corrective width is kept as it is when the received signal strength is not greater than the predetermined level and the variance is greater than the predetermined value.

23. The method according to claim 13, further comprising the steps of:

detecting that constant-value data is consecutively received for more than a predetermined time period; and fixing the phase of the clock when it has been detected that the constant-value data is consecutively received for more than the predetermined time period.

24. A digital demodulator for demodulating a digital-modulated signal into received data using differential detection, comprising:

a clock recovery circuit for regenerating a clock from the digital-modulated signal, wherein a phase of the clock is adjustable in steps of a clock corrective width; and a program-controlled processor for detecting a received signal strength, calculating a variance of phase differences in the digital-modulated signal, and controlling the clock corrective width of the clock recovery circuit based on the variance and the received signal strength.

* * * * *

UNITED STATES PATENT AND TRADEMARK OFFICE
CERTIFICATE OF CORRECTION

PATENT NO. : 6,269,128 B1
DATED : July 31, 2001
INVENTOR(S) : Hisayoshi Usui

It is certified that error appears in the above-identified patent and that said Letters Patent is hereby corrected as shown below:

<u>Column 6,</u>
Line 4, after "determination. Insert
-- Referring to Fig. 3A, in the case where no interference occurs, the variance $S_{VAR}$ of phase difference obtained by the variance calculator 301 decreases as the received signal strength $S_L$ increases as shown by curve 305.
    Referring to Fig. 3B, however, when interference occurs, the variance $S_{VAR}$ is not lowered below a certain level $V_{TH}$ (here, $10^3$) even if the received signal strength $S_L$ increases as shown by a curve 306.
    Therefore, in this example, a variance threshold $V_{TH}$ is set to $10^3$ and a received strength threshold $L_{TH}$ is set to 10dB μ and these thresholds $V_{TH}$ and $L_{TH}$ are used to determine whether interference occurs. In Fig. 1, the level comparator 303 compares the received strength threshold $L_{TH}$ to the received signal strength $S_L$ and outputs the comparison result $S_{COMP}$ to the clock corrective width decision section 302. The details of the clock corrective width decision will be described in detail hereinafter. --;
Line 15, after "deteriorates." insert -- Subsequently, the variance calculator 301 calculates a variance $S_{VAR}$ from the stored N differential data $DQ_1$-$DQ_N$ using the following equations (1) and (2) (step S405). --;
Line 34, delete "stop" insert -- step. --

Signed and Sealed this

Twenty-eighth Day of May, 2002

Attest:

*Attesting Officer*

JAMES E. ROGAN
*Director of the United States Patent and Trademark Office*